United States Patent

Hercher et al.

[15] 3,662,181
[45] May 9, 1972

[54] SCANNING APPARATUS FOR THE DETECTION AND IDENTIFICATION OF LUMINESCING CODE BARS ON ARTICLES

[72] Inventors: Michael Hercher, Rochester, N.Y.; Michael Madalo, Whitehouse Station, N.J.

[73] Assignee: American Cyanamid Company, Stamford, Conn.

[22] Filed: Apr. 22, 1970

[21] Appl. No.: 30,814

[52] U.S. Cl..........................250/219 D, 250/223, 250/71.5 S
[51] Int. Cl............................................................G08c 9/06
[58] Field of Search..................250/223, 219 D, 232, 71.5 S; 209/111.6, 111.7

[56] References Cited

UNITED STATES PATENTS

| | | | |
|---|---|---|---|
| 3,513,320 | 5/1970 | Weldon | 250/223 X |
| 3,331,963 | 7/1967 | Lippke | 250/232 X |
| 3,437,816 | 4/1969 | Mushinsky | 250/232 X |
| 2,848,921 | 8/1958 | Koulikovitch | 250/222 X |
| 3,105,907 | 10/1963 | Burkhardt et al. | 250/219 |

*Primary Examiner*—Walter Stolwein
*Attorney*—Bryan, Parmelee, Johnson & Bollinger

[57] ABSTRACT

A scanning apparatus is provided to identify information encoded in a series of parallel code bars on articles moving on a conveyor. The code bars are each made up of one or more materials capable of emitting light of a distinct color when exposed to ultraviolet light. The bars are illuminated and scanned transversely by an optical system including a focussing lens and a moving belt having a slit. The moving belt is generally opaque to the emitted light from the code bars. The moving belt moves in the focal plane of the lens. A diffusing lens is located behind the belt to diffuse the image received through the slit over a group of photo detectors, each photo detector being optically filtered to respond to one of the distinct colors with an electrical output signal. The output signals of the detectors actuate logic circuitry to identify and/or sort the article.

18 Claims, 6 Drawing Figures

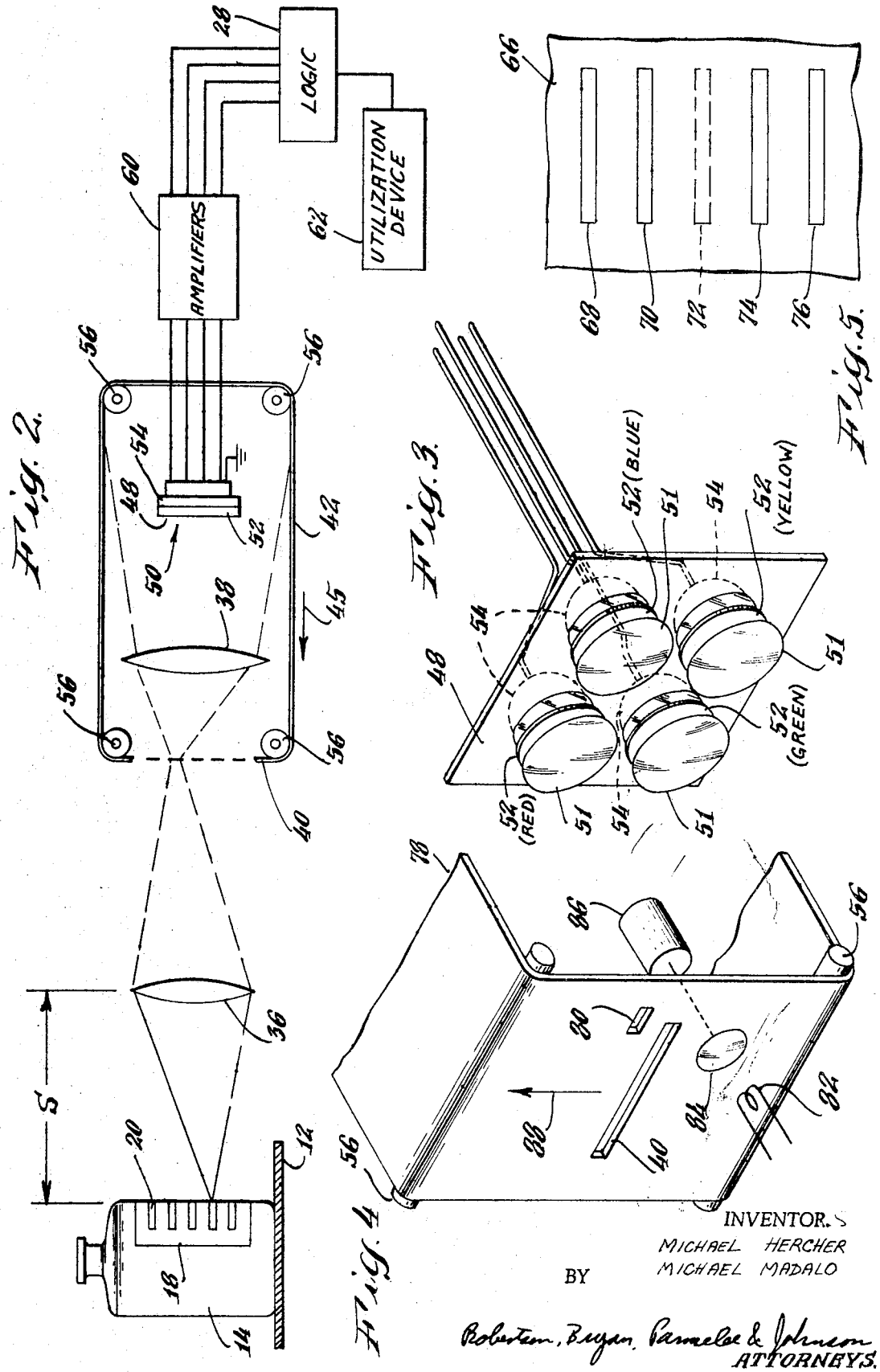

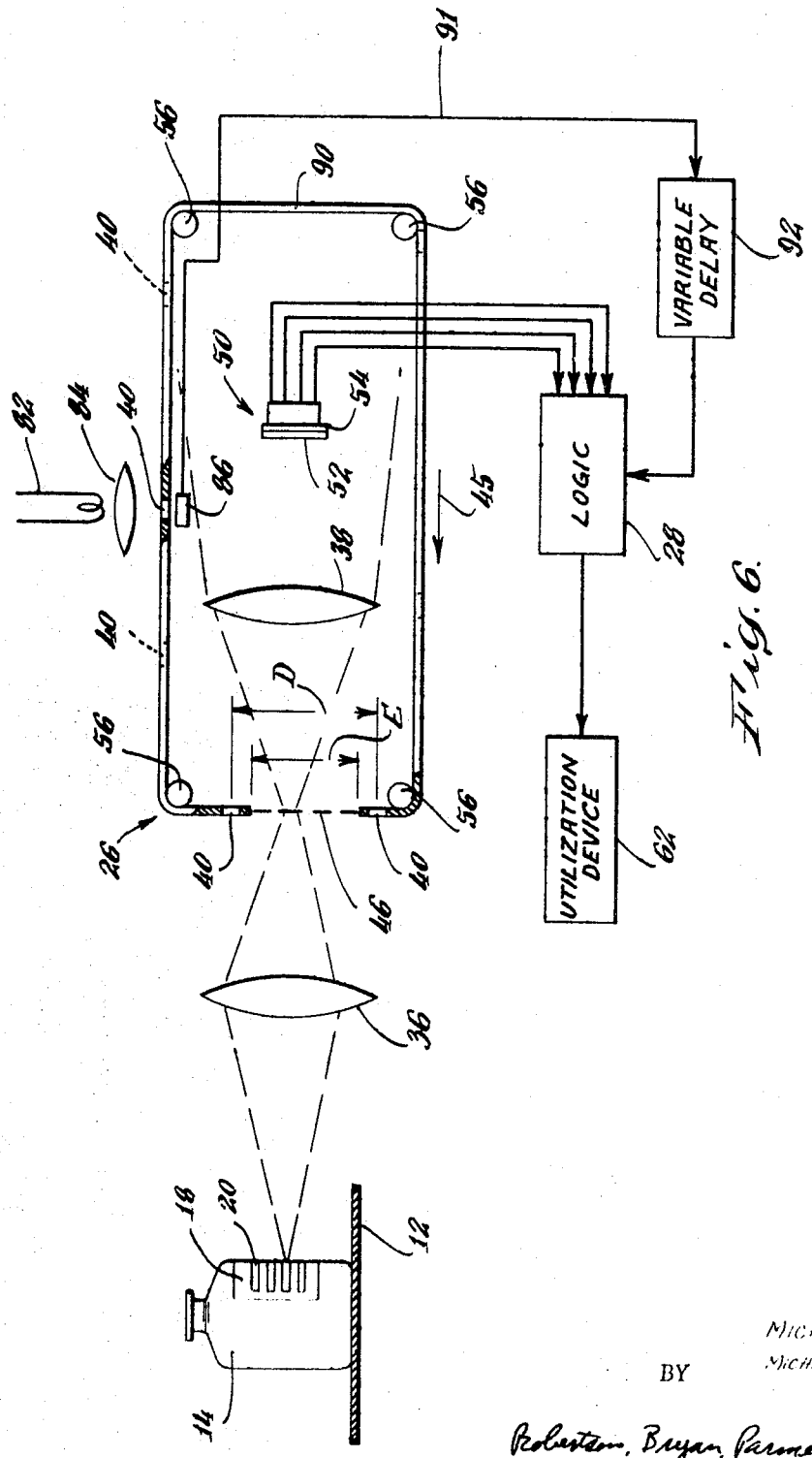

SCANNING APPARATUS FOR THE DETECTION AND IDENTIFICATION OF LUMINESCING CODE BARS ON ARTICLES

DESCRIPTION

This invention relates to an apparatus for the automatic scanning of articles. More specifically, this invention relates to an apparatus for scanning label markings located on articles passing an inspection station for purposes such as counting, identification, sorting and the like.

In the automated manufacture of articles their inspection or label verification is often conducted with the aid of prearranged code bars formed of a material, hereinafter referred to as a "luminescer," which radiates light within a narrow visible band of wavelengths. The need for a reliable detection and verification by scanning of these code bars may be especially appreciated when the articles contain medicinal supplies.

For instance, an article such as pre-filled vaccination-serum-containing syringes may be provided with code bar markings representing information as to content, quantity, type of serum, or the like. An accurate scanning and reading of these markings provides a convenient tool for sorting or checking and related manufacturing steps.

An advantage of this invention resides in providing an apparatus having the ability to scan automatically articles carrying luminescent markings in the form of parallel placed adjacent code bars. The luminescent materials referred to herein include those which radiate visible light by either phosphorescence or fluorescence processes. The code bars are individually detectable to reveal together with one another a code that may, for instance, be representative of a serial number. Other information as desired may be coded with these markings. These luminescing code bars are formed of luminescer materials which respond to externally applied radiation with a radiation of light falling within well-defined narrow (almost monochromatic) light bands. Different colors of light may be radiated depending upon the type of material employed within a code bar. Code bar marking may be composed of several different intermixed luminescing materials each of which radiates, upon stimulation from an external ultraviolet source, a different recognizable color wavelength. The article markings are scanned at a scanning station where the code bars are stimulated to radiate. The scanner employed permits the sequential spatial selection of code bar radiation which is directed upon a color recognizing detector to produce an electrical signal for code bar marking identification and verification.

A scanning apparatus in accordance with the invention utilizes articles provided with prearranged code bars which are scanned by a mask such as an opaque endless belt having a transparent slit. The belt is positioned to move relative to color recognizing detectors, each detector sensitized to respond to a particular color. The light sensitive surfaces of all the detectors are exposed to radiation from any one code bar passing through the moving slit. The slit is moved in a direction relative to the prearranged code bars so that the radiation from all code bars will expose the detector sequentially in time. Where several color radiating luminescers are intermixed in one code bar a parallel read-out of that code bar is obtained, since only the radiation from one bar at a time is exposed to the detectors. The scanning apparatus is provided with as many color-recognizable elements as there are possible different luminescers. As a result a huge number of different markings may be identified by selecting the different luminescer included in any one code bar as well as the number of code bars.

It is, therefore, an object of this invention to provide a versatile apparatus for the automatic identification of articles.

It is a further object of this invention to provide a scanner for automatically inspecting luminescing markings on articles of manufacture.

These and other objects and advantages will be understood from the following description of several embodiments of the invention in conjunction with the drawings wherein FIG. 1 is a perspective view of a conveyor system utilizing a scanner apparatus in accordance with the invention to verify labels placed on articles of manufacture located on the conveyor with portions of the scanner broken away to show enclosed structure;

FIG. 2 is a partial side view in elevation of the apparatus of FIG. 1;

FIG. 3 is a perspective view of a color radiation detector used with the apparatus of FIG. 1;

FIG. 4 is a perspective broken view of an alternative opaque endless belt for use with the apparatus shown in FIG. 1;

FIG. 5 is an enlarged view of code bar arrangement that may be used instead of that shown in FIG. 1;

FIG. 6 is a side view of a scanning apparatus using an endless belt provided with a plurality of selectively placed slits.

Figure 1:
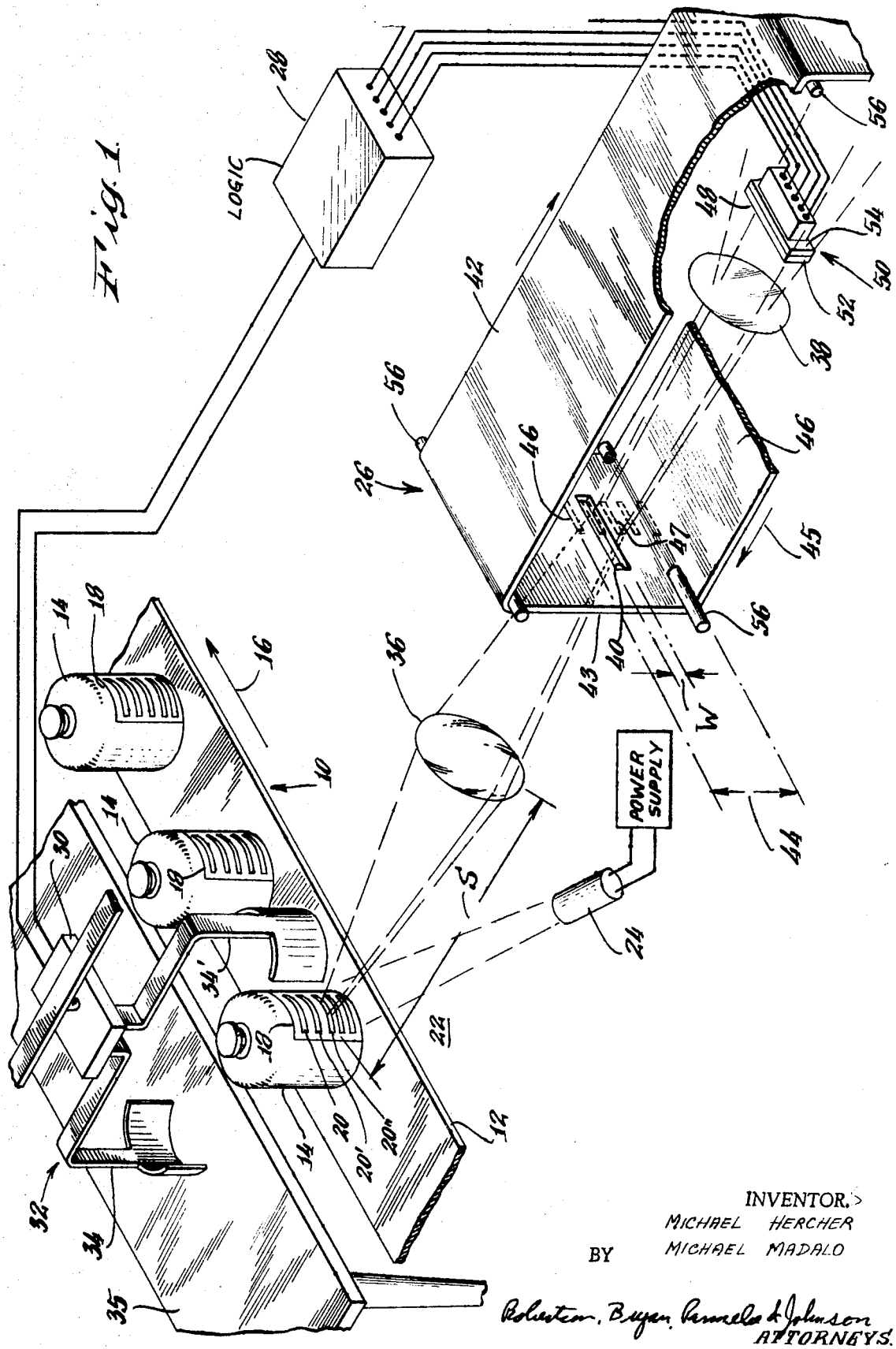

With reference to the FIG. 1, a conveyor system 10 is partially shown employing a moving belt 12 on which articles 14 to be inspected are placed to be moved in the direction as indicated by arrow 16. Articles 14 may be bottles containing a particular substance or syringes or generally any kind of merchandise to be inspected. Attached to articles 14 are labels 18 provided in addition to usual identifying information with a plurality of parallel arranged code bars 20. Alternatively code bar markings 20 may be directly placed on the article without a label such as in the form of bands on the barrel of a syringe. The code bars are formed of luminescing materials known as luminescers. The materials used for code bars 20 are of the previously described type which, when stimulated by radiant energy, such as ultraviolet light, produce radiations in well-defined color wavelength pass bands.

The code bars 20 may be formed of a single color radiating luminescer or include several intermixed luminescer materials radiating at different color wavelengths. With the latter arrangement each code bar 20 may represent as varied a number as desired. For instance, the use of two different luminescer materials with a five code bar arrangement provided 242 different identifications. An increase in the number of luminescer materials employed sharply increases the number of different code bars that can be identified. The code bars are shown in horizontal parallel stacked alignment on each of the labels 18 on the articles 14.

The articles 14 are conveyed past an inspection station generally indicated at 22 where the labels 18 and five code bars 20 are illuminated with radiation from a source 24 of ultraviolet light to stimulate radiation. The source 24 radiates in the ultraviolet region and the luminescer materials in code bars 20 respond with radiation in the visible spectrum.

A scanner 26 is employed with an optical system to scan parallel code bars 20 sequentially in space and time to produce electrical signals that are decoded by a logic network 28 to identify the information represented by the radiation from the bars 20. The logic network 28 analyzes the decoded code bar identification and provides an output signal if the code bar information indicates a malfunction or article reject or reveals a mislabelling. This output signal is applied to an actuator 30 to energize an article removing mechanism 32 for the removal of the article whose code bar failed to pass inspection by logic network 28. A removal apparatus 32 is shown in the form of a pair of gripper tongs 34—34' which automatically lift the article 14 off the conveyor 12 and deposit it on an adjoining platform 35.

Scanner 26 includes an optical system formed of a pair of optically aligned lenses 36 and 38. The lens 36 focuses an inverted image of the code bars 20, and thus their luminescing radiations, through a slit 40 of a mask such as an opaque belt 42 onto an image plane 44. For clarity, image plane 44 is shown as non-coincident with frontal plane 43 of opaque belt 42. However, in practice, slit 40 is preferably passed through the image plane for minimum interference of light radiation from adjacent code bars. In FIG. 1, the focused code bars are shown as suggested by dotted presentation 46 for those that are not in optical alignment with slit 40, whereas imaged code bar 47 is drawn in solid line to indicate its optical alignment with slit 40. Second lens 38 defocuses code bar images located in the vicinity of image plane 44 to illuminate the entire radiation sensitive surface 48 of a color sensitive detector 50. Lens 38 is located and selected to stabilize the code bar radiation on the detector surface. Detector 50 discriminates the several luminescer color radiations incident on its surface 48 with the employment of color sensitive band pass optical filters 52 located in front of light sensitive cells 54 which produce electrical signals representative of the radiations passed by filters 52. These electrical signals are passed on to logic network 28 for processing.

Belt 42 is preferably made of an opaque endless photographic film and is shown as an endless belt mounted for continuous movement by a suitable motor (not shown) about rollers such as 56 to provide scanning by slit 40 in the direction of arrow 45 of the code bars imaged by lens 36. Belt speed is adjusted commensurate with that desired to assure that each article 14 is scanned for identification of the code bars located thereon. Slit 40 is so shaped that as it is moved over image plane 44 it will illuminate detector surface 48 with the radiation from only one code bar 20 at any one time. For this reason, the distance, S, between the lens 36 and the article 14 as well as the width, W, of the slit 40 are selected to provide spatial discrimination of imaged code bars. Slit 40 is oriented parallel with code bar images 46 and slit motion is parallel with the direction of alignment of images 46.

FIG. 2 illustrates the apparatus of FIG. 1 with the image plane 44 coincident with the scanning plane of the slit 40. Note the illumination of the entire frontal surface 48 by luminescent radiation emitted from any one code bar passing through the slit 40. The outputs from the light sensing photo detectors 54 are amplified in amplifiers 60 before actuating the logic circuitry 28.

Logic circuitry 28 responds to the pulses present on the output lines from the elements 54 by recognizing the occurrence of the first, uppermost code bar 20 and decoding the information represented by the various colors in the code bar to generate a signal for utilization device 62. As shown in FIG. 1 the utilization device 62 may be an actuator mechanism such as 32. The logic circuitry encompasses conventional digital decoding networks and timing circuits for carrying out the recognition function.

FIG. 3 illustrates the optical wavelength band pass filters 52 and the photo detectors 54 in greater detail. The color band pass filters 52 are shown mounted in coplanar relationship with one another opposite like light cells 54. The filters pass different narrow bands of optical wavelengths which for clarity are indicated by the color labels as red, blue, green and yellow. It should be realized, however, that much closer spectral relations may exist, requiring that the filters 52 be more closely or further spaced in wavelength in correspondence with the type of luminescent materials employed in the code bars 20. In addition each element 54 is further provided with a preceding light gathering lens 51 to enhance the sensitivity of the scanner system.

The operation of the apparatus shown in FIGS. 1 and 2 is as follows. Belt 12 is moving in the direction indicated by arrow 16 with articles 14 thus being conveyed past scanning apparatus 26. At the same time that articles 14 are being moved, scanning belt 42 is moved in the direction shown by arrow 45, i.e., upwardly in a plane parallel with image plane 44 and in the vicinity thereof. Preferably, belt 42 is located so that slit 40 traverses image 46 while coplanar with image plane 44.

Slit 40 scans image 46 in an upward direction in order to transverse first the image from the uppermost code bar on label 18 followed by the images of lower located code bars.

Assume that each code bar may be formed of four distinct and detectable luminescer materials. In such case one may assign a particular significance to each of the colors in a code bar. For instance, red may be assigned as representing $2^0$, blue $2^1$, green $2^2$, and yellow $2^3$. Hence, a code bar containing each of these colors will be decoded as binary number 1111, i.e., in decimal numbering = 8+4+2+1=15. If a code bar contains only colors green and yellow, the binary number will be 1100, or in decimal numbering 8+4= 12. Hence, each code bar color may be considered as representing the presence of a digit in a binary number. In practice, the binary number 0000 is avoided so that a code bar identifying color will be present.

As slit 40 traverses image plane 44, the image of the upper code bar 18 will be permitted to pass therethrough onto diffusing lens 38. Lens 38 sufficiently diffuses the code bar image to assure complete illumination of all the employed different color detecting elements 54. Filters 52 assure that the different colors are distinguished and electrical signals appear at outputs of elements 54 commensurate with the binary number represented by a code bar 18. The electrical output signals appear in the form of substantially simultaneously occurring pulses, which, after amplification in amplifier 60, are applied to logic circuitry 28. This detection process is repeated for each traversal of a code bar image 46 by slit 40.

Logic circuitry 28 is thus supplied with a series of groups of pulses from the scanner apparatus. Each pulse group identifies one of the code bars. Logic circuitry responds to these pulse groups with a decoded instruction to a utilization device 62 such as removal mechanism 32 or a recorder. In this manner article label verification may be accomplished.

Each of the code bars 20 in each of the labels 18 in FIG. 1 always contains at least one of the luminescing materials so that synchronization can be achieved and maintained. FIG. 5, however, shows an alternate coding scheme on label 66. The label 66 is provided with a group of five distinct code bar locations 68, 70, 72, 74 and 76. These code bar locations are selectively occupied with a single luminescer material in direct relationship with the binary code that the entire group is to represent. If the occupation by a luminescer of a location is assigned to represent a "1" and the absence of a luminescer represents "0" then the group on label 66 represents the binary code 11011. A scanning of this label 66 with the scanner 26 of FIG. 1 would provide a pulse train from the light detector 54 corresponding to this binary number. Synchronization of the logic circuitry 28 to the scanning of a label such as 66 may be accomplished by using the uppermost code bar location 68 as the trigger. The uppermost code bar location would not in such latter case represent a binary number. With such synchronization the location 68 would always contain a luminescer and logic circuitry 28 includes an internal clock for synchronization timing purposes in the decoding of the remaining code bar locations.

In place of belt 42 of FIG. 1 a mask such as an endless belt 78 as partially shown in FIG. 4 could be employed. Belt 78 includes a slit 40 and a start slit 80. A light source 82 and a lens 84 which focuses light from source 82 on a light sensor 86 are optically aligned in registration with start slit 80 when this is brought into the illustrated position with belt 78 movement in the direction of arrow 88. The start pulse detected by light sensor 86 when the start slit passes light from the source 82 may be used to initiate the logic network 28. With knowledge of the belt speed, the time when slit 40 is properly positioned to pass the radiation from upper code bar location 68 may be determined from the start pulse and the upper code bar location 68 becomes available to carry information like the other code bar locations.

FIG. 6 illustrates an endless opaque belt 90 in use with a scanner 26. Belt 90 is provided with a plurality of evenly spaced transparent slits 40. The slits are spaced a distance D which exceeds the span E of the imaged code bars. Hence, no two slits 40 will simultaneously illuminate light detector 50 with code bar luminescer radiation. A start trigger may be generated on a line 91 with the aid of a light source 82, lens 84 and light detector 86 located in optical alignment with one another. When a slit 40 passes between the source 82 and light detector 86 a pulse is produced on line 91 and after suitable delay in network 92 is applied to start the identification of the code bars. The delay in network 92 is adjusted to assure correct synchronization between the start of logic circuit 28 and the placement of a slit 40 in image plane 44.

We claim:

1. An apparatus for the scanning of articles passing a scanning station where the articles are provided with parallel spaced and stacked code bars formed of luminescent materials which emit a narrow band of radiation of a preselected wavelength in response to stimulation from a source of radiant energy, comprising means located at the scanning location for imaging a luminescent code bar in an image plane, a color sensitive detector positioned to be illuminated by radiation from the imaged code bars and respond with an electrical signal representative thereof, an opaque movable endless mask having a transparent code-bar-radiation-passing slit oriented transversely to mask motion and parallel with the code bars, means for mounting the mask for movement between the code bars and the color sensitive detector in a plane generally parallel with the image plane and in the vicinity thereof, said mask traversing the image plane with the slit generally parallel with individual imaged code bars, said belt slit further being sized to permit passage of stimulated radiation from but one code bar at any one time to illuminate the color sensitive detector with radiation from the code bars sequentially in time and space without illumination overlap from adjacent code bars.

2. The apparatus as claimed in claim 1 wherein the mask is located for movement in the image plane.

3. The apparatus as claimed in claim 1 and further including means positioned between the mask and the color sensitive detector for illuminating the light sensitive surface of the detector with imaged code bar radiation from any one code bar.

4. The apparatus as claimed in claim 3 wherein said illuminating means includes a lens arranged and selected to stabilize the code bar radiation on the detector surface.

5. The apparatus as claimed in claim 1 wherein the mask is in the form of an endless belt for repetitive scanning of articles with continuous movement of the belt across the image plane.

6. The apparatus as claimed in claim 5 wherein the endless belt is further provided with a starting slit selectively located with respect to the code bar radiation passing slit to derive position information of the code bar radiation passing slit with respect to the imaged code bars, and means for sensing the position of the start slit and for producing an electrical signal representative of when the code bar radiation passing slit is located in radiation passing relationship with a selected first code bar in the stack of scanned code bars.

7. The apparatus as claimed in claim 1 and further including means for producing a signal for identifying when the slit is in radiation passing relationship with the first code bar in the stack of scanned code bars.

8. The apparatus as claimed in claim 1 wherein the mask is formed of an opaque photographic film strip having a transparent line generally located transversely to the longitudinal dimension of the strip.

9. The apparatus as claimed in claim 8 wherein the film strip is arranged in the form of an endless belt and provided with a plurality of transparent parallel lines selectively spaced from one another along the strip to avoid multiple exposure of the light detector to code bar radiation from more than one line.

10. The apparatus as claimed in claim 1 wherein the color sensitive detector includes a plurality of light detecting elements, each of said light detecting elements being formed with photo detectors, each of said photo detectors being provided with a light discriminating filter selected to pass a predetermined wavelength band from the code bars.

11. The apparatus as claimed in claim 10 and further including means responsive to signals from the photo detectors for generating a decoded output signal indicative of the information represented by the color provided code bars.

12. The apparatus as claimed in claim 11 and further including means responsive to the decoded output signal for sorting said articles in correspondence therewith.

13. An apparatus for the detection and identification of articles by sensing the radiation from luminescent markings selectively located on the articles wherein each marking may be formed of several selected color radiating luminescer materials, comprising means located at a scanning location for imaging light radiated by the markings in an image plane, means producing an endless mask provided with a transparent slit having a predetermined physical size and shape to spatially select one of said imaged luminescent markings, means for moving said mask in a direction to cause a selected traversal of images by the slit, means for diffusing light from images passing through the slit to illuminate a selected area with the light passed through the slit, light discriminating means operatively located facing said diffused light illuminated area for producing in response to said diffused illumination output signals representative of the luminescer materials present in a mark.

14. The apparatus as claimed in claim 13 wherein the light discriminating means includes a plurality of closely spaced substantially coplanar mounted photo detectors, and light filters interposed over the photo detectors, each of said light filters being selected to pass predetermined light radiations corresponding to the light radiated by a selected one of said luminescer materials.

15. The apparatus as claimed in claim 14 and further including means responsive to signals from the photo detectors for producing a decoded output signal and means responsive to the decoded output signal for sorting the articles in accordance therewith.

16. An apparatus for the detection and identification of articles by sensing the radiation from luminescent markings selectively located on the articles wherein each marking may be formed of several selected color radiating luminescer materials, comprising means for imaging the markings in an image plane with the radiations of the markings selectively arranged in the image plane, an endless opaque belt having a transparent slit with a preselected orientation and with the slit sized to pass radiation of one mark image at a time, means for mounting the belt slit for continuous movement past the imaged markings, a plurality of individual color discriminating and detecting elements operatively facing light passed through the moving slit, each of said elements producing an electrical signal representative of the presence of a wavelength band in said light radiation, a diffusing lens responsive to the imaged luminescent marks passed through the slits, and diffusing lens being sized and located to provide a focal length selected to illuminate all of said light receiving elements with light from one imaged marking and to obtain serial signal groups from the light detecting elements, with each group representative of the colors present in a marking and the serial groups being representative of markings associated with an article.

17. The apparatus as claimed in claim 16 wherein the endless belt is provided with a plurality of transparent slits, each slit being sized to pass the light from but one imaged marking, said slits being evenly spaced from one another by a distance exceeding the image size of all imaged markings on an article.

18. An apparatus for the detection and identification of articles where the articles are provided with coded markings selectively prearranged and each formed of a luminescer material selected to emit a predetermined wavelength band of radiation in response to stimulation from a source of radiant energy, comprising means for imaging the light radiations of the markings in an image plane, an opaque, endless mask having a transparent slit, said slit being sized to limit passage of radiation of one imaged marking at a time, means for mounting the mask slit for movement past the imaged markings, a plurality of individual color discriminating and light detecting elements operatively facing light passed through the moving slit, each of said elements producing an electrical signal representative of the presence of a color in a marking on an article, and means responsive to the electrical signals from the light detecting elements to detect the coding represented by the markings on an article.

* * * * *